Figure 4:
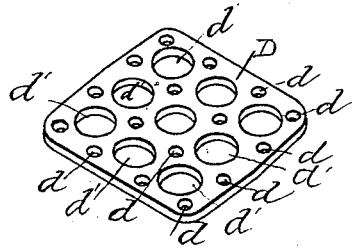

(No Model.)

M. MEEHAN.
MACHINE FOR THE MANUFACTURE OF CONDUITS.

No. 388,295. Patented Aug. 21, 1888.

WITNESSES.
Fred. B. Dolan
J. B. Gardner

INVENTOR.
Michael Meehan
by his attys
Clarke & Raymond

UNITED STATES PATENT OFFICE.

MICHAEL MEEHAN, OF BOSTON, MASSACHUSETTS.

MACHINE FOR THE MANUFACTURE OF CONDUITS.

SPECIFICATION forming part of Letters Patent No. 388,295, dated August 21, 1888.

Application filed July 13, 1887. Serial No. 244,131. (No model.)

*To all whom it may concern:*

Be it known that I, MICHAEL MEEHAN, of Boston, in the county of Suffolk and State of Massachusetts, a citizen of the United States, have invented a new and useful Improvement in Machines for the Manufacture of Conduits, of which the following is a full, clear, and exact description, reference being had to the accompanying drawings, forming a part of this specification, in explaining its nature.

The invention is an improvement upon that described in the application of George Richardson, filed June 8, 1887, Serial No. 240,595; and it relates especially to a device for centering the tamps and for centering the mandrels or formers, and also for providing the mandrels or formers with a slight movement or blow upon each reciprocation of the tamps. The machine described in the said Richardson application is adapted to manufacture multiflue pipe or conduit; and it embodies the employment of a mold-box containing a number of mandrels or formers, about which the cement or material of which the conduit is made is packed and solidified by tamps. These mandrels or formers are supported at their lower ends only, and as the conduits are constructed are liable to be moved out of line slightly, or to an extent which often prevents either their removal or the removal of the conduits in an unbroken condition. This defect in the organization and operation of the machine I overcome by using a plate which acts as a guide for the rods holding the tamps, and which is adapted to be reciprocated with the tamps, and which also acts to close upon the upper ends of the mandrels and to sustain or support them centrally at their upper ends during the reciprocation of the tamps, and also to strike the mandrels or formers sufficiently to cause them to in a measure enlarge the holes in the conduit which they are forming, or at any rate to prevent the mandrels from being wedged by the tamps too tightly.

In the drawings I have illustrated only enough of the Richardson machine to show the construction and operation of my invention.

Figure 5:
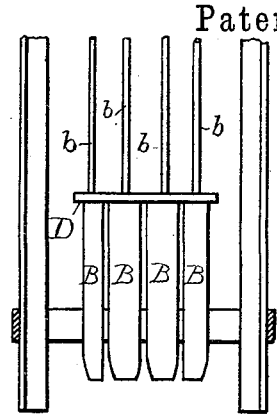
Figure 5:
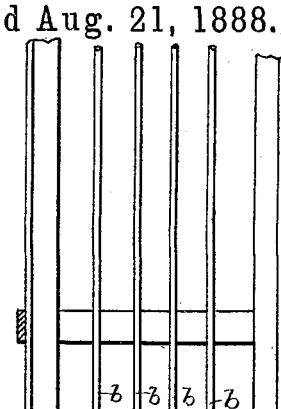
Figure 5:
Figure 3:
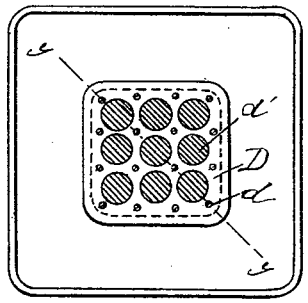
Figure 2:
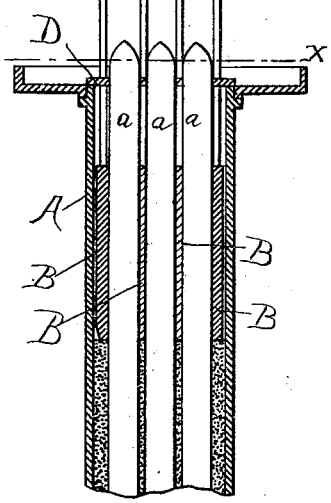
Figure 1:
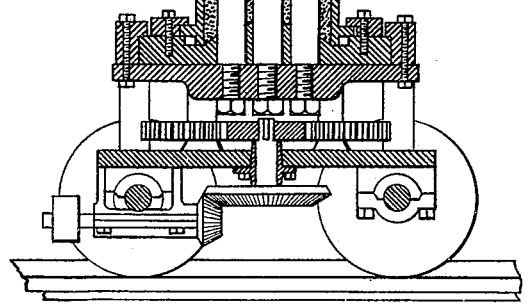

In the drawings, Figure 1 is a view in section of sufficient of the Richardson machine to illustrate my invention. Fig. 2 is a view in vertical section of many of the parts represented in Fig. 1, showing the tamps and their centering-plate depressed down. Fig. 3 is a view in horizontal section upon the line $x$ $x$ of Fig. 2. Fig. 4 is a view in perspective of the centering-plate. Fig. 5 is a vertical section on the line $y$ $y$ of Fig. 3.

Referring to the drawings, A is the mold-box.

$a$ are the formers or mandrels.

B are the tamps, which are attached to a cage or head, as described in said Richardson application, and which are operated as therein specified.

D is a plate attached to the carriage or head to move therewith and having the hole $d$, through which the tamp-rods $b$ extend, and also the larger holes, $d'$, which preferably are undercut or provided with an outward-flaring edge. (See Fig. 5.) These holes are of a size to receive the upper ends of the mandrels $a$ and to fit the same quite closely, so that the plate, when moved down upon the mandrels, acts to center the mandrels and to sustain them above at a uniform distance apart. The upper ends of the mandrels are tapered, as represented in Fig. 1, and the edges of the hole $d'$ are also beveled, in order that the mandrels may readily enter the holes of the plate as it is dropped with the tamps and cage. It is obvious that this plate cannot be dropped upon the mandrels without causing them to be jarred to some extent, and especially the ones that may be out of line.

In operation the cage or head and tamps are dropped, as described in said Richardson application. The tamps, however, instead of being guided by the guiding-rods therein described, are held apart by the plate D until they enter the cavities in the mold-box between the mandrels, and the plate D is at the same time caused to be moved downward upon the mandrels, the ends of the mandrels entering the holes $d'$ therein, and the plate then acts not only to center the tamps, but also to center the mandrels and support them, and also to jar them.

The operation of building the conduit is substantially the same as that described in said application.

Having thus fully described my invention, I claim and desire to secure by Letters Patent of the United States—

1. In a machine for manufacturing multiflue pipes or conduits, the combination, with the mold-box having a series of mandrels or formers, $a$, of a series of tamps, B, a series of rods for operating said tamps, and a plate, D, having a series of holes, $d$, for guiding the tamp-rods, and a series of larger holes, $d'$, to receive the upper ends of the mandrels and bring them into and hold them in proper or true positions, substantially as set forth.

2. In a machine for making multiflue pipes or conduits, the combination, with a mold-box having a series of mandrels or formers, $a$, of a series of reciprocating tamps and tamp-rods, and a reciprocating plate, D, having a series of holes, $d'$, to receive the mandrels, and a series of holes, $d$, to permit of the passage of the tamp-rods, but not of the tamps, so that the latter will lift the said plate and cause it in its descent to strike or jar the mandrels and center the same, substantially as set forth.

MICHAEL MEEHAN.

In presence of—
F. F. RAYMOND, 2d,
J. M. DOLAN.